J. BECKER.
COPYING AND ENLARGING CAMERA.
APPLICATION FILED JAN. 24, 1917.
1,280,638.
Patented Oct. 8, 1918.
5 SHEETS—SHEET 1.
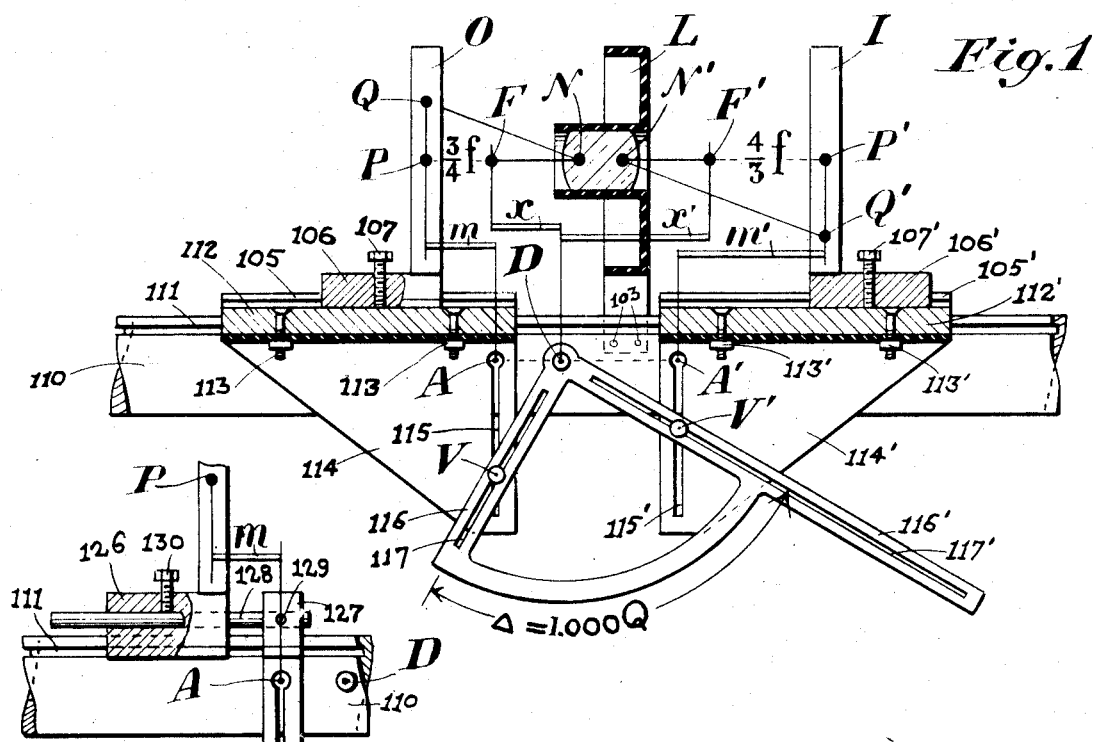
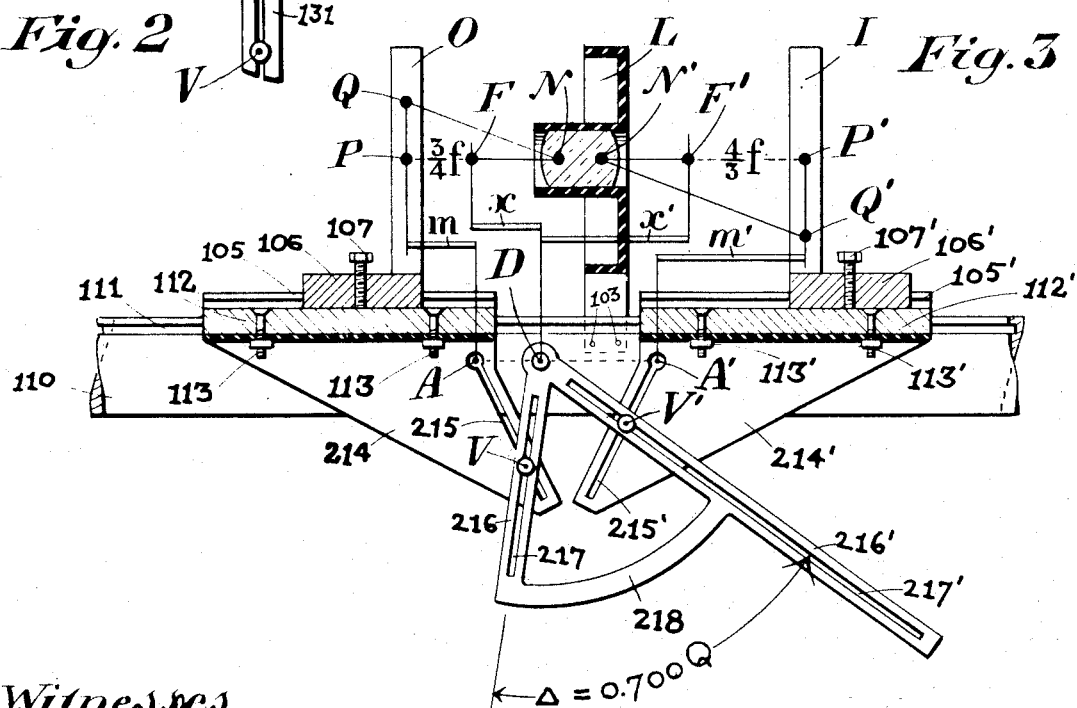
Witnesses
Mary E. Cowell.
Fred S. Corbett
Inventor
Joseph Becker

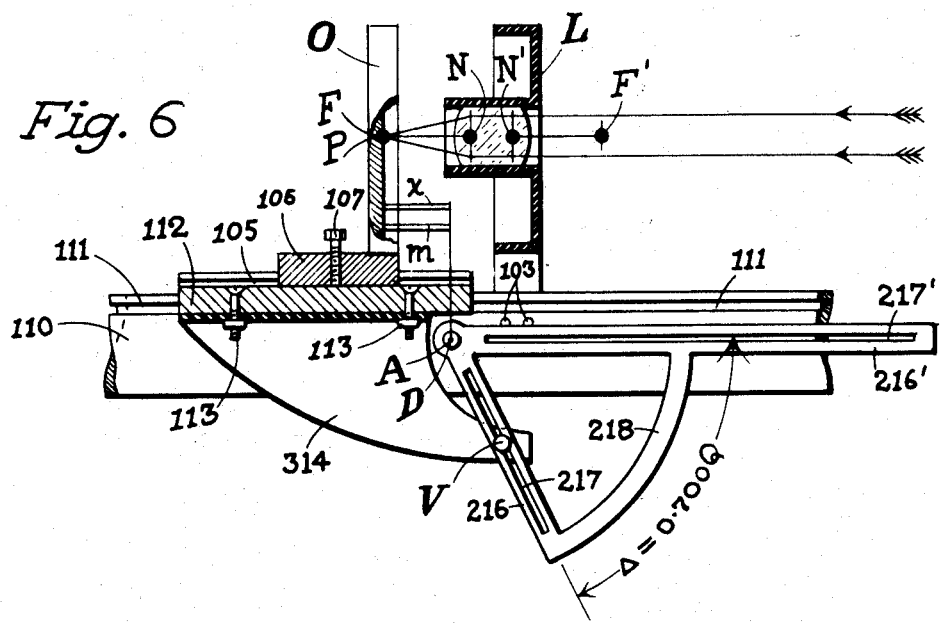
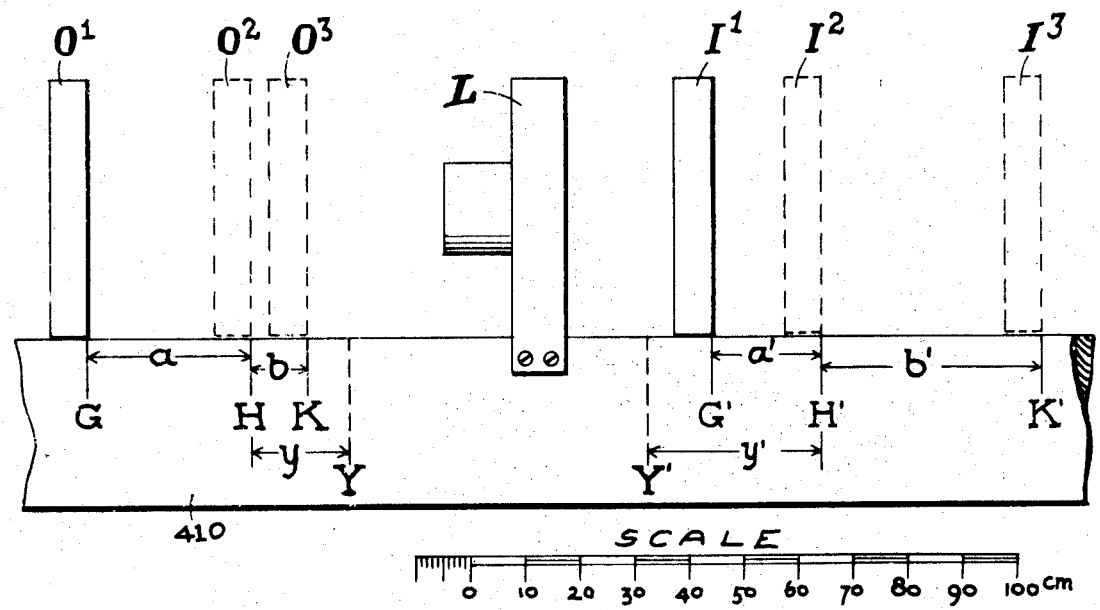

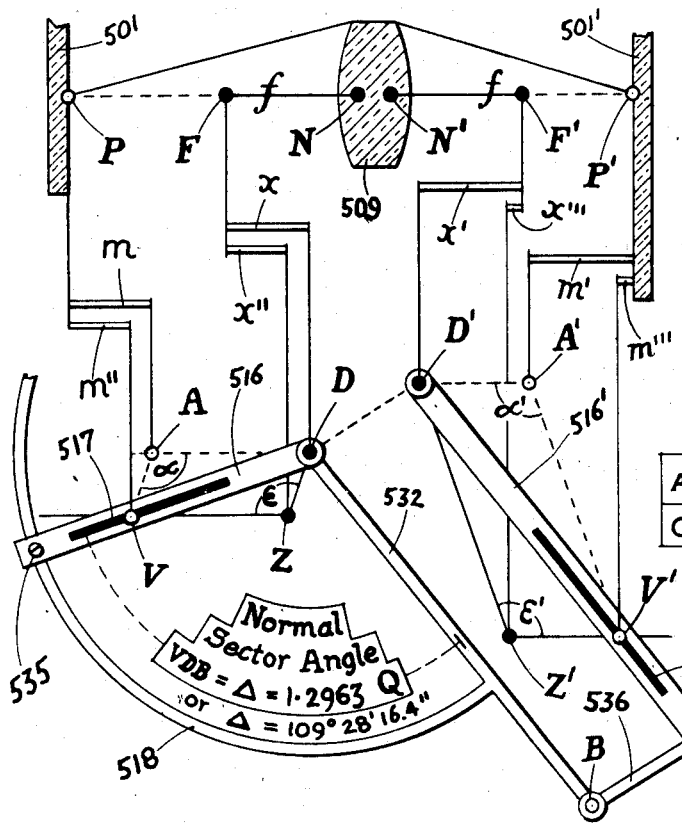
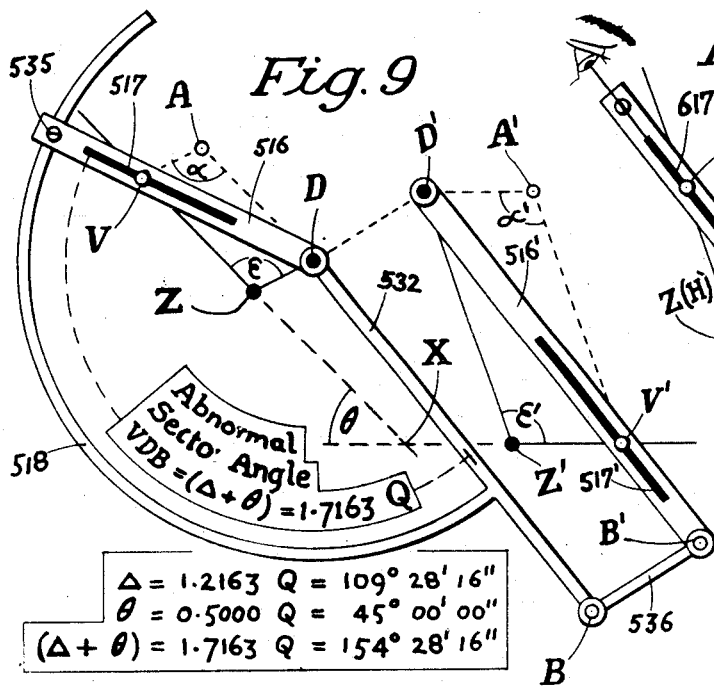
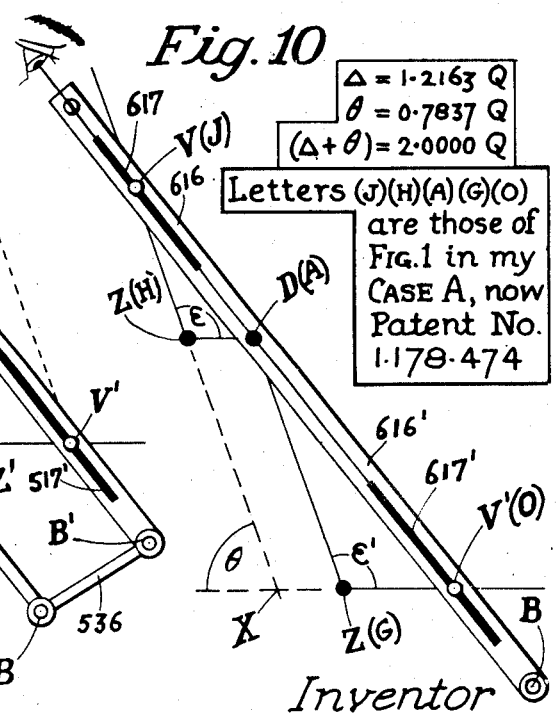

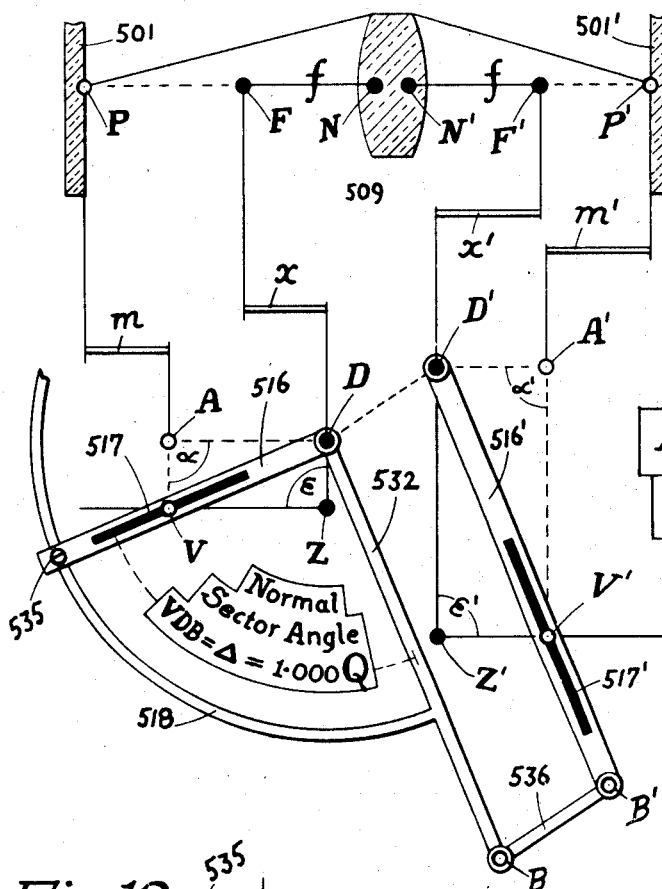
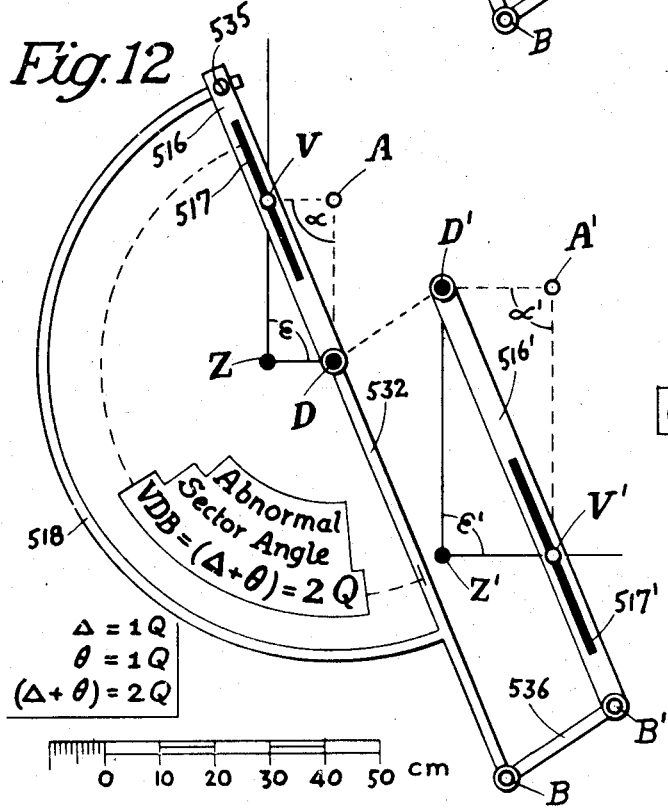
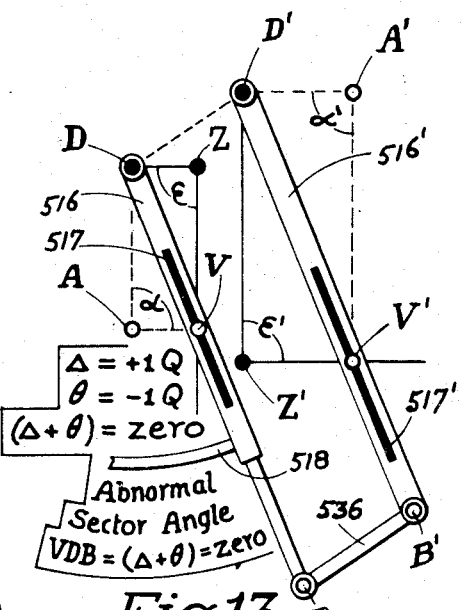

UNITED STATES PATENT OFFICE.

JOSEPH BECKER, OF WASHINGTON, DISTRICT OF COLUMBIA, ASSIGNOR TO EASTMAN KODAK COMPANY, OF ROCHESTER, NEW YORK, A CORPORATION OF NEW YORK.

COPYING AND ENLARGING CAMERA.

1,280,638.  Specification of Letters Patent.  Patented Oct. 8, 1918.

Continuation of application Serial No. 732,488, filed November 20, 1912. This application filed January 24, 1917. Serial No. 144,264.

*To all whom it may concern:*

Be it known that I, JOSEPH BECKER, a citizen of the United States, residing at Washington, in the District of Columbia, have invented certain new and useful Improvements in Copying and Enlarging Cameras, of which the following is a specification.

The present patent application, identified for convenience of reference as my Case Au, is a "continuation" of my herein merged and therefore expressly abandoned prior application Case Y, Serial No. 732,488, filed Nov. 20, 1912.

My present Case Au, and my other hereinafter specifically referred to related applications or patents, may all be listed in their letter name or filing date order, as follows: Case A, Serial No. 26,647, filed August 11, 1900, now Patent 1,178,474, issued April 4, 1916; Case K, now Patent 1,103,342, issued July 14, 1914; Case O, now Patent 1,103,343, issued July 14, 1914; Case T, now Patent 1,142,295, issued June 8, 1915; Case U, now Patent 1,190,214, issued July 4, 1916; Case X, Serial No. 727,548, filed December 24, 1912; Case Y, (based on present Figs. 1 to 7), Serial No. 732,488, filed November 20, 1912, but now merged in and continued as the present Case Au; British Patent 29,701, filed December 24, 1912; Case Ab, now Patent 1,178,477, issued April 4, 1916; Case Ae, Serial No. 66,371, filed December 11, 1915; Case Ai or Division 2 of A, Serial No. 88,619, filed April 3, 1916, but now merged in and continued as Case Bc; Case At, Serial No. 143,085, filed January 18, 1917; the present Case Au or continuation of Y, Serial No. 144,264, filed January 24, 1917; and the still later Case Bc or continuation of Ai, Serial No. 255,491, filed September 24, 1918.

General statement of invention.

The present invention consists primarily in an improved specific form of the radial cam mechanism that is used for automatically focusing the copying or enlarging cameras of my said Case U, such improvement being dependent upon the use of three special structural features, to wit: (1) special structural end frame terminals A and A' that are alined with the sector or lens frame pivot D, as in my said Cases K, O and T, and that are used in addition to the normal end frame pintles A, A' of said Case U, such normal end frame pintles being now identified, in my said Cases Ae, At, present Au, and later Bc, as pintles V and V'; (2) means for offsetting the paths of the said two end frame pintles, V and V', to any desired extent; (3) a focusing sector whose angle VDV' is smaller than a right angle.

In the more general demonstrative form, present Fig. 4, I provide structural means for setting the sector angle VDB, also the two dependent or equal end frame angles, DAV and D'A'V', at any preferred value, either smaller, as shown, equal to, or larger than a right angle, so that my invention, in its broader aspects, does relate generally and without exception to all those varieties of the "theoretically exact radial cam focuser," which have so far been disclosed by me, first in Figs. 1 to 24 in my said Case A, and then in nine of my said other cases, to wit: Cases U, X, Y, British, Ae, Ai, At, present Au, and later Bc.

These ten different specifications treat of five different varieties of the radial cam focuser, to wit: (1) the "wholly mechanical" as in my said Case U, and in the present Figs. 1 and 3; (2) the "one-sight" optical, of my said Case At; (3) the "two-sight optical" most clearly represented in Fig. 3 of my said Case A; (4) the "double-sight optical" most clearly represented in Fig. 4 of my said Case A; (5) the theoretically important "double-ender optical" derived from Fig. 34 in my said case Bc.

From disclosures made in the present Case Au, as well as in my said earlier Case Ae, and especially in my said later Case Bc, it appears conclusively that one same general rule of construction, adjustment, and regulation, must generally be applicable to these five different varieties of the radial cam focuser.

While my present invention, therefore, relates primarily to mechanical radial cam focusers having a basic angle that is acute; in its more general aspects, it covers all those varieties of the either right or oblique angle theoretically exact radial cam focuser so far treated of by me as follows: (1) in Figs. 1 to 24 of my said Case A, as obtuse angle optical focusers; (2) in my said Case U, as right angle mechanical focusers; (3) in my said Case X, as a special form of the right angle mechanical focuser; (4) in my said Case Y, which is based on present Figs. 1 to 7, as either right or oblique but preferably acute angle mechanical focusers; (5) in my said British patent, as right angle mechanical focusers; (6) in my said Case Ae, as either right or oblique angle focusers, either optical or mechanical, but mainly obtuse angle optical; (7) in my said Case Ai as obtuse angle double-sight optical; (8) in my said case At as obtuse angle single-sight optical; (9) in the present Case Au, as either right or oblique but preferably acute angle mechanical focusers, with mechanical focuser forms that are sufficiently general to include as special cases, all other forms, either right or oblique angle, and either optical or mechanical; (10) in my said Case Bc, as either right or oblique angle focusers, either optical or mechanical, but mainly obtuse angle optical.

*The "optico-mechanical" focuser.*

The mechanical focuser of Fig. 20 in my said Case U, with its terminal A' located in its corresponding image plane P', may be called an "optico-mechanical" focuser, because it is directly convertible into an optical focuser, of the type disclosed in Figs. 1 to 24 of my said Case A, by providing the lens frame of the camera, in the said Fig. 20, with any suitable means for sighting horizontally through D' toward A', and then obliquely from C', along C'A'. Point A', situated in the conjugate image plane P', then virtually becomes a free external object point to be photographed, geometrically identical with the object point O in Fig. 3 of my said Case A, assuming angle OGA in said Fig. 3 to be a right angle.

Any thus derived optical focuser, however, must have its pivot C' mounted directly over the external principal focus F' of the camera lens, so that the angle N'F'C' shall be a right angle, and this requires an outrigger or bracket, like the imaginary bracket $x$ DD'C', that projects out in front making the camera too cumbersome for use as a hand camera.

The device is rendered practical, however, by rotating the vector D'C' (which, considered *per se*, may be made as long as desired) counter-clockwise, about D' as geometrical pivot, so as to throw the structural or sector pivot C' of said Fig. 20 back where it will be situated directly over, or on, some part of the ordinary lens supporting frame of the camera.

In order that this change shall produce no change in the theoretical accuracy of the focuser, however, the pivoted sector angle A'C'A, and the stationary lens frame angle CDA must both be opened up to the same extent. The two equal obtuse stationary lens frame angles A'D'C' and CDA of said Fig. 20 Case U are then made identical with the two equal obtuse stationary lens frame angles $r$ at G, and $r$ at H, in Figs. 17, 18 and 23 of my said Case A.

That is to say, the optical focusers of my said Case A are in fact radial cam focusers whose basic angle, $r$ at G, also $r$ at H, is larger than the right angle; whereas all radial cam focusers either shown or only referred to in my said Case U, have the corresponding basic angle, at D and D', equal to the quadrant or one right angle.

The mechanical focuser seen in Fig. 19 of my said Case U is converted into the "optico-mechanical" form by shifting the whole focusing gear, to the right, through a distance equal to the length of the bar $m'$ so as to bring the terminal A' into the image plane P'. This makes $m'$ equal zero, as in Fig. 20.

In the complete form of focuser Fig. 12 of said Case U, it is sufficient to shift the right hand part C'D'A' of the focusing gear to the right through the distance $m'$.

The terminal pintle A' of my said Case U really corresponds, not to the present terminal A', but to the present terminal V'; and, therefore, in the present Fig. 8, the bar that corresponds to bar $m'$ of my said Case U, is not bar $m'$, but bar $m'''$.

This ends my rather long, but really necessary introductory explanation of the very close relationship that connects the "optical" type of radial cam focuser, seen in Figs. 1 to 24 of my said Case A, with the "wholly mechanical" forms of the present Case Au.

*Description of present Figs. 1 to 13.*

From the disclosures made in my said Cases A, and Ae, it appears that the "obtuse angle" radial cam is specially advantageous in "optical focusers", whereas the "acute angle" radial cam is specially advantageous in "mechanical focusers"; and, therefore, while, as before stated, my broadest present claim does include focusers of the "obtuse-angle" type, my most specific present claim is limited to focusers of the "acute-angle" type.

As in my said prior Cases K, O, T, and U, all forms shown contain longitudinally adjustable connections between the gear proper and the camera frames for at least two of the three camera frames, and the third camera frame connection is preferably made longitudinally invariable, regardless of the properties of the lens to be used in the camera. As in my prior application Case U, and in my said other applications, Cases K, O, and T, the drawings, for clearness, are limited to forms in which this third longitudinally invariable frame connection is that made with the lens frame.

In the accompanying drawings where similar reference signs refer to similar parts:

Figure 1 is a longitudinal vertical section of a copying or enlarging camera having radial cam gear of the rectangular type with adjustments to permit of setting the horizontal paths of the end frame pintles at any desired relative height.

Fig. 2 is a detail view of a modified form of adjustable gear and frame connection.

Fig. 3 is a longitudinal vertical section of a copying or enlarging camera in every respect similar to the camera of Fig. 1, but with radial cam gear of the acute angle type.

Fig. 6 is a modified form of Fig. 3.

Fig. 7 illustrates my general three-point method of adjustment.

Figure 4:
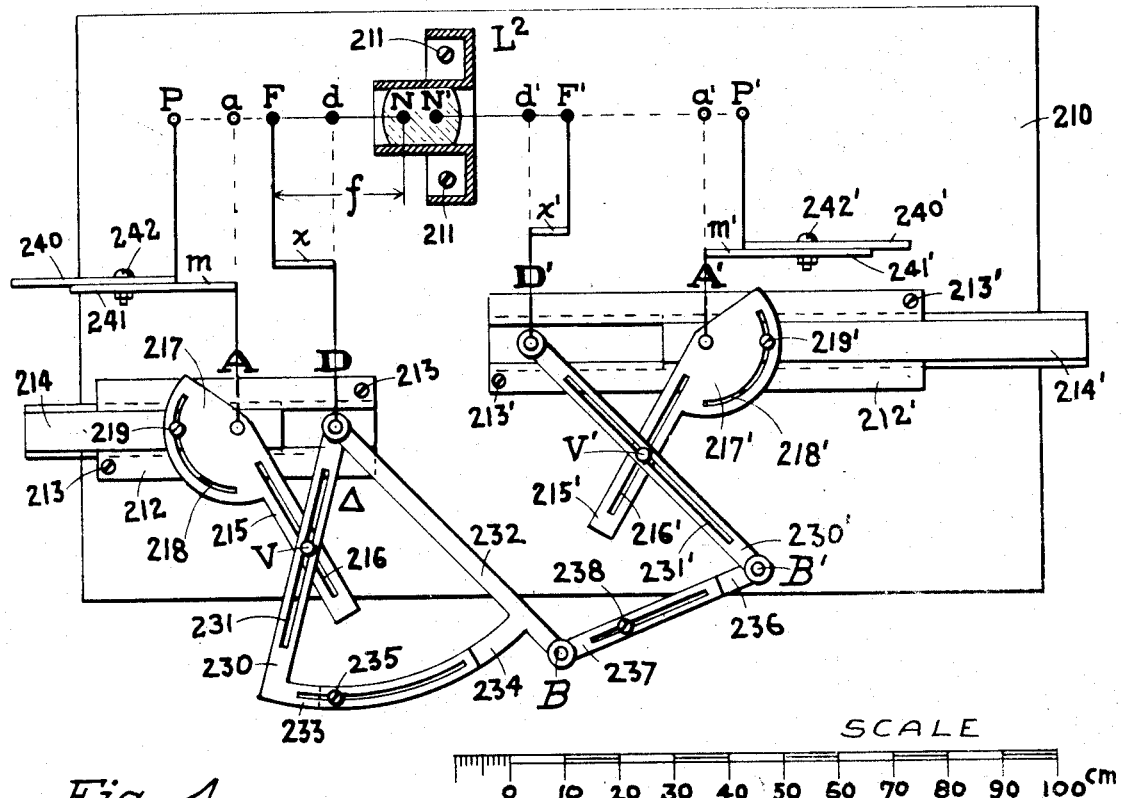
Fig. 4 shows a complete form which virtually embodies in one structure all other forms of radial cam focusing gear.

Figs. 8 to 13, with equations annexed as part thereof, are explanatory diagrams.

*Rectangular type, Figs. 1 and 2.*

Referring to Fig. 1, the bed 110 of this general form has a slideway 111 for two carriages 112 and 112'; and in the carriage 112 is formed a longitudinal slideway 105 for a slide block 106, which directly supports the object frame O and which has a set screw 107 for clamping the object frame O in any desired longitudinal adjustment on carriage 112. The image frame I is similarly clamped in any desired longitudinal adjustment on carriage 112' by means of set screw 107' threaded in the slide block 106' of slideway 105'; and the lens frame L is rigidly fixed to bed 110 by screws 103.

To the under side of carriage 112 is fastened by bolts 113 a bracket 114 having a vertical slot 115 in which the object frame pintle V may be slid vertically to be clamped by a nut at any desired height on the bracket. To the under side of carriage 112' is similarly fastened by bolts 113' a bracket 114' having a vertical slot 115' for the vertical adjustment of the image frame pintle V'.

A transverse pin or rod D slipped horizontally through the bed 110 serves as a fulcrum for a focusing lever 116, 116', with rectangularly disposed radial cam slots 117, 117'.

The upper end of slot 115 at the same level as pin D is enlarged to form a bore A of the same diameter as pin D, in order that the carriage 112 may be slid into position to admit and be held temporarily by pin D while the object frame O is being focused on right-hand infinity. The upper end of slot 115' is similarly provided with an opening A' to permit of holding carriage 112' while the image frame I is being focused on left infinity.

The distances AD, DA' are the co-varying Newtonian space elements of the focusing gear and either of these space elements may be reduced to zero value by means of pin D, as just explained.

After the object and image frames (O, I) have been positioned on their respective carriages (112, 112') by focusing on infinity, as in my said cases K, O, T, and U they are set and temporarily held in focus on each other at a finite distance, say with their carriages in the relative position shown in Fig. 1, where the copying factor is made exactly equal to 4/3, for clearness only, as no attention is paid to its exact value. The lever 116 is then mounted on its pin D and one of the end frame pintles, say V, is inserted and clamped at any desired elevation in the vertical slot 115. The other end frame pintle, here V', will then have to be inserted where its vertical slot 115' is met by the radial slot 117' and the device is ready for use. As pintles V, V' when set as shown move in offset horizontal planes, the device as adjusted in Fig. 1 is the equivalent of the Stevens or Cook gear typified in Fig. 9 of my said Case U, and which I refer to by these names because it first appeared in French Patent No. 330,565 of 1903 to Stevens, and then in British Patent No. 12734 of 1904 to Cook.

If the carriages 112, 112', be temporarily clamped in any finite focal relation, that of Fig. 1, for instance, and pintles V, V' both be loosened, any other desired operative value may be given to the distances AV, A'V' by simply turning the sector 116, 116' on its pivot D. Thus by turning it clockwise AV may be reduced and A'V' increased until AV equals A'V'; and the device will then act as a Carpentier gear, the gear shown in Fig. 7 of my said Case U, and originally described in German Patent No. 102,004 of 1897 to Carpentier. By continuing the clockwise rotation, A'V' may be made longer than AV and the device again becomes a Stevens or Cook gear.

The camera of Fig. 1, therefore, permits of realizing, not only all varieties of focusing gear represented in Figs. 2, 7, 9, 10 and 18 to 20 of my said Case U; but also all proportions of such different varieties. This is of practical importance because it allows the user to select freely the arrangement and the proportions of such arrangement that happen to be the most satisfactory.

Block 106 and carriage 112 of Fig. 1 simply constitute a longitudinally adjustable connection between the object plane P and the connecting point A to regulate the dimension m. This is more easily seen in Fig. 2, where the block 126 and carriage 127 are treated as similar carriage elements united by a telescoping rod 128. This rod 128 is fixed to the carriage 127 by pin 129, and it is clamped in any desired relation to block 126 by the screw 130. The bracket 114 of Fig. 1 here becomes a plain arm 131.

The image frame would in this case preferably be mounted in the same manner to regulate $m'$ by means of parts corresponding to said parts 126 to 131 that need not be illustrated.

*Non-rectangular type, Fig. 3 and Fig. 6.*

All radial cam focusing gear heretofore proposed is dependent upon the more or less evident presence of two co-varying but always similar basic triangles such as ADV and A'V'D, Fig. 1, that are rectangular at A and A'. In Fig. 3, I show a form in all essential particulars similar to Fig. 1, but in which these same basic triangles are non-rectangular, with the constant angle at A and A' equal to seventy per cent. of a right angle (0.700 Q). In this Fig. 3 the camera bed 110, slideway 111, pin D, frames O, L, I, the lens, the carriages 112, 112', and other parts 105, 105', 106, 106', 107, 107', 113, 113' are all identical with the similarly identified parts of Fig. 1, so that the two figures differ only in the focusing lever 216, 216' and in the brackets 214, 214'. The bracket 214 has an inclined slot 215 for the inclined adjustment of pintle V; and the bracket 214' has an oppositely inclined slot 215' for the inclined adjustment of pintle V'. The upper ends of these slots 215, 215' at the level of pin D are enlarged to form holes A, A' of the same diameter as pin D to permit of reducing the co-varying mechanical space elements DA, DA' to zero value as in Fig. 1. The different inclinations are determined by the rule that angles DAV and DA'V' shall each be equal to the angle VDV' of the sector 216, 216' and the adjustments are made exactly as in Fig. 1. Fig. 1, in fact, is simply the special case of Fig. 3 in which the angles, just referred to, are all three made equal to one right angle. An obtuse angular form may be formed by making the same three angles severally equal to an angle that is greater than a right angle.

The angle VDV' of the focusing sector in Fig. 3 may, therefore, have any desired value, that shown being 70 per cent. of a right angle (0.700 Q). Within certain limits, the smaller this angle is made, the smoother the mechanism will operate, especially if the driven pintle be set as low as possible, and, therefore, the device may be constructed with the driven pintle non-adjustable and permanently fixed in its lowest desirable position, as in Fig. 6.

The combination partly shown in Fig. 6 is made by simply unmounting bracket 214 in the combination of Fig. 3, and substituting the bracket 314, so that all parts except this one bracket are the same in the two figures. Bracket 314, Fig. 6, is deeply recessed at its right hand edge in the region surrounding point A of Fig. 3, so that the object carriage 112 may be slid up into zero position without removing the lens pivot D.

Fig. 6 shows carriage 112 in its zero position, that is, with the Newtonian space element AD of the focusing gear reduced to zero value, so that the other Newtonian space element DA' of the gear must be infinite. To reduce AD to zero value, therefore, the sector 218 is simply turned up into the position where its image arm 216' is parallel to the slideway 111, this being the position that it would occupy if it were infinitely long and still in engagement with pin V' carried to infinity with its frame I.

By focusing the object frame O on right infinity as shown in the figure, it is, therefore, virtually focused on the image frame, and the co-varying Newtonian space elements PF, F'P' of the lens are made exactly equal to the corresponding co-varying Newtonian space elements AD, DA' of the mechanism.

In the combination of Fig. 6, therefore, the fundamental principles of adjustment are exactly the same as in the combination of Fig. 3, the only difference to be noted being that point A of Fig. 3 is real, while point A of Fig. 6 is purely imaginary.

The position of point A with relation to bracket 314 is virtually determined by the sector 218 and its position changes with the value delta (Δ) of the sector angle. The bracket 314 may, therefore, be used with a rectangular sector or with any other provided the image bracket 214', 215' be made to form an angle DA'V' equal to the sector angle delta (Δ) to be used.

When dimension $m'$ is determined by reducing the corresponding Newtonian space elements DA', F'P' to zero value the object frame O is virtually carried to left infinity, and the image is reduced to a point F'. On the other hand, when O is focused on right infinity, as in Fig. 6, to determine $m$ the image is virtually made infinitely large; and when P is focused directly on P' the image is of any preferred finite size. My infinity method of adjustment, therefore, from a purely mechanical point of view, secures exact correspondence of the lens and gear for three different values of the copying factor $n$, to wit: one infinitely small value, one infinitely large value and an intermediate or finite value. The adjustments secure what may be called a three-point correspondence between the mechanism and the lens; and this three-point correspondence, in a theoretically accurate focuser such as the one here considered, insures all-point correspondence.

*Complete form, Fig. 4.*

Fig. 4 is a scale drawing of a complete adjustable form specially adapted to illustrate the general structural conditions that apply to the cameras of Figs. 1 to 3. It is, however, sufficiently general, as will appear presently in connection with the diagram Figs. 8 to 13, to explain the structural elements of every conceivable form or type of radial cam focuser, either optical or wholly mechanical.

Here 210 is a table or board on which the lens frame $L^2$ is firmly fastened by screws 211. Slideways 212, 212′ are fastened on the same table 210 by screws 213, 213′ in any arbitrarily selected position, but, in order to avoid the use of bevel gearing and other needless mechanical complications, they should preferably be set, as shown, exactly parallel to the lens axis FF′.

One of these two slideways is mounted directly on the table, while the other is held at a certain distance above in order that either shall be freely adjustable in its own plane parallel to the table 210, without fear of interfering with the other, to permit of setting the two in any desired position. When set to overlap with their produced axes D, D′ in coincidence, the two points D, D′ merge into the one point D of Figs. 1 and 3.

Carriages 214, 214′ are fitted in the slideways 212, 212′ and serve to hold and support the movable object and image frames, which are diagrammatically represented by their focal planes P, P′.

At point A of carriage 214, is pivoted an arm 215 with radial groove 216 which is held at any inclination to the carriage by means of a sector 217 with arcuate slot 218 and a clamp screw 219 that screws into the carriage 214. The radial groove 216 provides adjustment for the object frame pintle V, which has a nut or other suitable clamping means to permit of clamping it in its slot 216 at any desired distance AV from A.

Carriage 214′ is similarly provided at A′ with the corresponding elements 215′ to 219′ and with means to permit of clamping the image frame pintle V′ in its slot 216′ at any desired distance V′A′ from A′.

At D on slideway 212 is mounted the bar 230 with radial cam slot 231 to admit and coöperate with pintle V; and at D′ on slideway 212′ is mounted the radial cam 230′ with radial slot 231′ to admit and coöperate with the image frame pintle V′.

At D is also pivoted a second bar 232 which may be clamped in any desired angular relation delta ($\Delta$) to bar 230 by means of the overlapped arcs 233, 234 and clamp screw 235.

Arms 232 and 230′ are connected by an adjustable link comprising link elements 236 and 237 and a clamp screw 238. The length BB′ should be exactly equal to DD′ to form an articulated parallelogram DBB′D′.

*Use of the complete form, Fig. 4.*—The slideways 212, 212′ are first located arbitrarily in any desired position, such as that illustrated, and bar BB′ is set to make BB′ equal DD′. Points D and D′ may henceforth be conceived as invariably connected with the principal focal planes F, F′ of the lens at distances $x$, $x'$ therefrom, and the setting of D and D′ may be considered as a free adjustment of the distances $x$ and $x'$.

The distance of the object plane P from the object frame pintle A should be $m$, equal $x$; and to surely permit of securing this equality, the connection $m$ is made adjustable, as indicated by slides 240, 241 and clamp bolt 242.

The distance $m'$ of the image plane P′ from the image frame pintle A′ is similarly made adjustable by slides 240′, 241′ and clamp screw 242′ to permit of making $m'$ exactly equal to $x'$. It is evident that bars $m$ and $m'$ might both be invariable and that in such case the bars $x$ and $x'$ should be the adjustable bars, as explained in connection with Figs. 12 to 15 of my said Case T, page 3, lines 80 to 89, where other variations are also considered.

Figure 5:
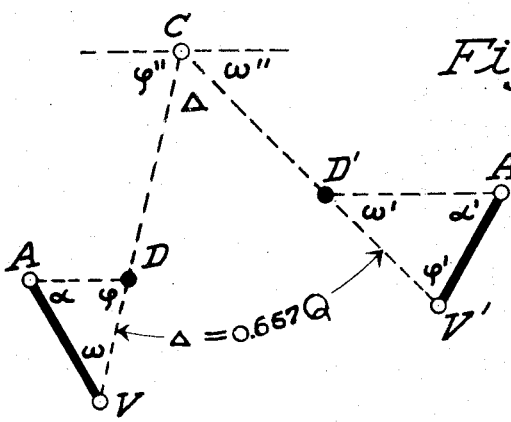
Fig. 5 is a diagram of angles determined in Fig. 4.

The two angles DAV, D′A′V′, respectively designated by alpha ($\alpha$) and alpha prime ($\alpha'$) in Fig. 5, should both be made equal to the sector angle delta ($\Delta$), which may be a right angle, as in Fig. 1, or an obtuse angle, as in my Case Ae, and which is preferably made acute, as in Figs. 3 and 4, when the focuser is mechanical.

The pintles V, V′ are mounted at any desired distances AV, V′A′ from A and A′ that will form a product (AV.V′A′) equal to the square of the focal length of the lens.

Fig. 4 is drawn to scale, with angles alpha ($\alpha$), delta ($\Delta$) and alpha prime ($\alpha'$), each equal to two-thirds of a right angle (0.667 Q). The focal length $f$ equal FN is 24 cm; and the internodal distance NN′, here purposely made large, to show it is duly accounted for, is 6 cm. The distance $m$, equal $x$, equals 11 cm. The distance $m'$, equal $x'$, equals 7 cm. The product AV.V′A′ or $25 \times 23.04$ equals 576 or $f^2$.

The four axes A, D, D′, A′ are projected onto the lens axis F F′ by vertical planes and the alined point projections so obtained are designated by the four corresponding lower case letters $a$, $d$, $d'$, $a'$, so that all structural conditions may conveniently be summed up in the four following equations, to wit:

$$\alpha = \Delta = \alpha' \quad \text{(1)}$$
$$m = Pa = Fd = x \quad \text{(2)}$$
$$m' = P'a' = F'd' = x' \quad \text{(3)}$$
$$AV.V'A' = f^2 \quad \text{(4)}$$

All proportions in Fig. 4 have purposely been selected so that the different elements Pa, Fd, P'a', F'd' shall be clearly separated. As a rule, in Figs. 1 and 3, for instance, they overlap and are not so easily distinguished. The four cardinal points F, N, N', F' of the lens and the two points d, d' are all six shown as black dots to indicate that they are stationary; whereas, points P, a, a', P' are shown as perforated or wheel dots to indicate that they move.

Equation 2 is satisfied by simply making $m$ equal $x$, and equation 3 is similarly satisfied by making $m'=x'$.

It is directly evident in Fig. 4 that in all cases $$Fd+dd'+d'F'=FF',$$

so that, if equations 2 and 3 are satisfied, this equation becomes $$m+dd'+m'=FF' \quad\quad (5)$$

Moreover, when equation 2 is satisfied, we evidently have $$Pa = Fd$$
$$Pa + aF = aF + Fd$$
$$PF = ad \quad\quad (6)$$

Similarly, when equation 3 is satisfied, we have $$P'a' = F'd'$$
$$P'a' + a'F' = a'F' + F'd'$$
$$P'F' = a'd' \quad\quad (7)$$

In equations 6 and 7, PF and P'F' are the co-varying Newtonian space elements of the lens, and $ad$, $d'a'$ are the corresponding and equally co-varying Newtonian space elements of the mechanism.

Referring now to the diagram, Fig. 5, where points D and D' are stationary, and, therefore, shown as black dots, let VD and V'D' be produced to meet in C at an angle delta ($\Delta$). Supposing equations 1 and 4 are satisfied, then AV and V'A' (shown in full lines), as well as angles alpha ($\alpha$), delta ($\Delta$), alpha prime ($\alpha'$) will henceforth remain invariable. All other sides shown dotted AD, DV, A'D', D'V' and the angles phi ($\varphi$), omega ($\omega$), phi prime ($\varphi'$), omega prime ($\omega'$) will vary during the operation of the device.

Drawing a line at C parallel to AD or D'A' to form the variable angles phi second ($\varphi''$) and omega second ($\omega''$) respectively equal to phi ($\varphi$) and omega prime ($\omega'$), we have $$\varphi'' = \varphi$$
$$\omega'' = \omega'$$
$$\Delta + \varphi'' + \omega'' = 2 \text{ right angles}$$
$$\alpha + \varphi + \omega = 2 \quad " \quad "$$
$$\alpha' + \varphi' + \omega' = 2 \quad " \quad "$$

and, noting that alpha ($\alpha$), delta ($\Delta$) and alpha prime ($\alpha'$) were made equal by adjustment to satisfy equation 1, the last three equations yield $$\varphi'' + \omega'' = \varphi + \omega = \varphi' + \omega'$$

whence by substituting for phi second ($\varphi''$) and omega second ($\omega''$) their equivalents phi ($\varphi$) and omega prime ($\omega'$)

$$\varphi + \omega' = \varphi + \omega$$
$$\varphi + \omega' = \varphi' + \omega'$$

and these by cancellation become $$\omega' = \omega$$
$$\varphi = \varphi'$$

Throughout all movements, therefore, of the properly regulated device the angles alpha ($\alpha$), phi ($\varphi$), omega ($\omega$) will remain, respectively, equal to the angles alpha prime ($\alpha'$), phi prime ($\varphi'$), omega prime ($\omega'$) and the triangles ADV, A'V'D' will remain similar, yielding $$\frac{AV}{AD} = \frac{D'A'}{V'A'}$$

or $$AV \cdot V'A' = AD \cdot D'A'$$

This, in view of equations 4, 6 and 7, yields $$ad \cdot d'a' = f^2 \quad\quad (8)$$

Here $ad$ and $d'a'$ are respectively equal to AD and D'A', as before stated, the co-varying Newtonian space elements of the focusing gear corresponding to the respectively equal and similarly co-varying Newtonian space elements PF, F'P' of the lens.

Equations 5 to 8 have all been derived from equations 1 to 4, in which they are implied, so that in adjusting and regulating the device nothing more need be done than to satisfy the first four equations.

Equation 1 is readily satisfied by direct adjustment of angles alpha ($\alpha$), delta ($\Delta$) and alpha prime ($\alpha'$) to secure the desired equality of these three angles. In Fig. 5 they are each made equal to 0.667 Q, as before stated.

Equation 2 is preferably satisfied, as in my said prior Cases K, O, T and U, by simultaneously reducing the Newtonian space element $ad$ of the mechanism and the corresponding Newtonian space element PF of the lens to zero value. This is done by holding axis A coincident with axis D while focussing P on right infinity. Here $m$, equal to $x$, equals 11 cm.

Equation 3 is similarly satisfied by simultaneously reducing the Newtonian space element $d'a'$ of the mechanism and the corresponding Newtonian space element P'F' of the lens to zero value; and this is done by holding axis A' in coincidence with axis D' while focusing P' on left infinity. Here $m'$, equal to $x'$, equals 7 cm.

Equation 4 is satisfied by selecting any desired position for pin V or V' and then determining the corresponding position for the other pin V' or V by focusing P directly on P'. Here AV was selected as 25 cm; and V'A', equal to 23.04, is supposed to have been found by focusing P on P' at any preferred finite distance.

When the slideways 212, 212' of Fig. 4 are set in alinement with their produced axes D, D' in coincidence, the distances DD' and BB' are both reduced to zero value and the complete form of Fig. 4 evolves into a simple form such as that of Figs. 1, 3 or 6. In all simple forms, therefore, points D and D' are merged in one point D which projects onto the lens axis as a double point $d$, $d'$, so that equations 1 to 8 apply to the simple forms as well as they do to the complete form by noting that in the simple forms $dd'$ is *nil*.

General three-point adjustment.

My infinity method of adjustment and regulation, as explained above in connection with Fig. 6, virtually consists in securing exact coöperation of the gear and lens for three different focal relations of the camera frames; i. e., for three different values of the copying factor $n$, to wit: one infinitely small value; one infinitely large value; and, one intermediate or finite value.

These three different $n$ values, however, may all three originally be finite, as will now be proved in connection with Fig. 7.

In Fig. 7, let the movable end frames have their positions marked on the camera bed 410 by drawing vertical lines, such as G, G', in alinement with the right hand faces of the frames as convenient planes of reference.

If now the object frame be set in three different arbitrarily selected positions, $O^1$, $O^2$, $O^3$, indicated on the bed 410 by marks G, H, K, the three conjugate positions $I^1$, $I^2$, $I^3$ of the image frame I may be found by focusing with a ground glass, or by computation, or in any other preferred manner; and then appropriately marked on the bed 410 as G', H', K'.

Any focusing mechanism that is fully operative should evidently oblige the image frame to successively occupy the three different positions G', H', K', when the object frame is made to successively occupy the positions G, H, K.

My focusing mechanism is provided with the three independent adjustments that are necessary and sufficient to unconditionally and exactly secure this three-fold correspondence, however irregular or arbitrary the spacing of the marks G, H, K and G', H', K', may happen to be.

Let Y be the unknown position that frame $O^1$ would come to if it were set in focus on right infinity; and similarly, let Y' be the unknown position that frame $I^1$ would come to if it were set in focus on left infinity.

Furthermore, let the known displacements GH, HK of the object frame be $a$ and $b$, and the unknown displacement HY be $y$. The same letters primed, or $a'$, $b'$, $y'$, may be used for the corresponding displacements of the image frame.

Now, consider the frames in the first position $O^1 I^1$. The distance YG or $(y+a)$ must equal PF, the Newtonian space element of the lens; and the distance Y'G' or $(y'-a')$ must equal the conjugate Newtonian space element F'P'. We, therefore, have $$(y+a)(y'-a') = PF \cdot F'P' = f^2$$

where $f$ is the unknown focal length FN of the lens.

When the frames are shifted to the second position, $O^2 I^2$, the Newtonian space elements become $y$ and $y'$, so that we may write again $$yy' = f^2$$

and when the frames are shifted to the third position, $O^3 I^3$, the conjugate Newtonian space elements become $(y-b)$ and $(y'+b')$ so that $$(y-b)(y'+b') = f^2$$

We, therefore, have three unknown quantities $y$, $y'$ and $f$ determined by the three following equations:

$$yy' = f^2$$
$$(y+a)(y'-a') = f^2$$
$$(y-b)(y'+b') = f^2$$

The last two equations yield:

$$yy' - a'y + ay' - aa' = f^2$$
$$yy' + b'y - by' - bb' = f^2$$

and, noting that $yy'$ cancels $f^2$, we have $$-a'y + ay' - aa' = 0$$
$$+b'y - by' - bb' = 0$$

from which we finally derive $$y = (a' + b') \frac{ab}{ab' - a'b} \quad \text{------(9)}$$

$$y' = (a + b) \frac{a'b'}{ab' - a'b} \quad \text{------(10)}$$

With these equations 9 and 10 we can calculate the values of $y$ and $y'$ and we can plot the exact position of marks Y and Y'. This enables us to set either end frame in focal relation on infinity for adjustment of the two connections $m$, $m'$ by the infinity method of adjustment. The gear proper is then adjusted by setting the frames in any preferred one of the three finite relations GG', HH' or KK'.

In Fig. 7, which is drawn to scale, we have $a = 30$ cm    $a' = 20$ cm
$b = 10$ cm    $b' = 40$ cm and we are supposed to know nothing about the lens. These four displacements $a$, $b$, $a'$, $b'$, however, inserted in equations 9 and 10 yield directly:

$$y = (20 + 40) \frac{(30 \times 10)}{(30 \times 40) - (20 \times 10)} = 18$$

$$y' = (30 + 10) \frac{(20 \times 40)}{(30 \times 40) - (20 \times 10)} = 32$$

If in equations 9 and 10 the quantities $a$ and $b'$ be both made infinite we obtain:

$$y = b$$
$$y' = a'$$

and we see that the infinity method may be treated as a special case of this more general three-point method of adjustment.

This general three-point method of adjustment with all three $n$ values finite is applicable in the manner just described to any one of the cameras shown in the present application and in my said prior Cases K, O, T, U, Y, Ab, Ae, At, all of which are provided with means required for reducing the Newtonian space elements of the focuser to zero value.

It is also applicable to my improved form of the Cook camera shown in my Case X, (Serial No. 727,548, filed October 24, 1912) in the following manner: The four dimensions $a$, $a'$, $b$ and $b'$ having been measured, compute $$f = \sqrt{yy'} = \frac{\sqrt{aba'b'\ (a+b)\ (a'+b')}}{ab' - a'b} \quad \text{(11)}$$

Then set the object frame at distance $f$ to the left of Y and the image frame at distance $f$ to the right of Y' in order to place and temporarily hold the two end frames in the "unity position." Then make WD equal DW', equal $2f$, to regulate the gear proper; and finally clamp the end frames to their carriages in the relative positions thus assumed. The mechanism will then operate to make the end frames pass simultaneously through the corresponding positions GG', HH', KK', and this insures an all-point correspondence of lens and gear.

By means of this general three-point method, a lens specially designed for a limited range of work can be accurately regulated for any three pair, or six, conjugate positions selected within the limits of its range of usefulness. The method is, therefore, specially valuable in regulating and adjusting to secure the sharpest chemical or actinic focus.

*Third method of adjustment.*

When the focal length $f$ of the lens is accurately known, the proportions of the focusing mechanism proper can be constructed or adjusted in accordance with such value and then the two dimensions $m$, $m'$ may be determined indirectly by means of the calculated Newtonian space elements AD, D'A' corresponding to a determined value of the copying factor $n$ which equals the ratio PQ/P'Q' of Figs. 1 and 3. For particulars, see the description of steps followed in adjusting and regulating the Fig. 1 camera of my said prior Cases K and O.

In applying this third method to the improved Cook camera of my Case X, it is more convenient to calculate and use the full conjugate distances PN, N'P'.

*Diagram, Fig. 8.*

The diagram, Fig. 8, is similar in principle to Fig. 4, but analytically more complete, in that it shows two different sets of Newtonian spaces in the mechanism, to wit: the old set AD, D'A', already considered in Figs. 1 to 6, and a new set VZ, Z'V', whose elements will eventually enable us to show the exact relations that exist between the various types of radial cam focusers shown or referred to in my different applications or patents, as follows: First, in Figs. 1 to 24 of my Case A showing optical focusers of the radial cam type with a basic angle $r$ Fig. 17 of any preferred value, but generally larger than a right angle; secondly, mechanical focusers of the radial cam type with a basic angle equal to one right angle shown or only referred to in my said Case U and in my said British Patent 29,701 of 1912; thirdly, the radial cam focusing gear shown in my said Case X; fourthly, the radial cam focusing gear shown in Figs. 1 to 6 of my said Case Y, where the basic angle delta ($\Delta$) may be of any desired value, to wit: rectangular, fixed oblique, or adjustable; fifthly, the either optical or radial cam focusing gear shown in my said Case Ae with a basic angle delta ($\Delta$) of any desired value; sixthly, the radial cam optical focusing gear shown in my said Case At, filed January 18, 1917, where the sector angle delta ($\Delta$) is adjustable for use with any one of different lenses; seventhly, or generally, any one of the five different varieties of the radial cam focuser enumerated at the beginning of this specification.

The lens 509, as in Fig. 4, is supposed to be stationary. Its four cardinal points F, N, N', F' are likewise stationary, and the fact that they do not move is indicated by showing them as black dots. The end frame conjugate points P and P', being on the contrary movable, are shown as perforated or wheel dots.

The same convention is adhered to in the mechanism where the four black dots D, Z, D', Z', indicate stationary lens frame points and the four perforated or wheel dots A, V, A', V', indicate movable terminals that move with their respective end frames.

The left-hand radial cam 516, with radial cam slot 517, and pivoted on the stationary lens frame terminal D causes the movable object frame terminal V, to move horizontally along path VZ in which Z is the zero position of V, or the position into which pintle V would come if the equal distances PF and AD were both reduced to zero value by setting the object plane P in focus on right hand infinity.

The right-hand radial cam 516', with radial slot 517', and pivoted on the stationary lens frame terminal D', causes the movable object frame terminal V', to move horizontally along path Z'V' in which Z' is the zero position of V', or the position into which pintle V' would come, if the equal distances F'P' and D'A' were both reduced to zero by setting the image plane P' in focus on left hand infinity.

The spaces PF, AD and VZ, are evidently three representations of the left varying Newtonian space of the combination, so that we have throughout all variations of such space.

$$PF = AD = VZ \quad \text{.........} \quad (12)$$

The spaces FP', D'A' and Z'V' are similarly, three representations of the right-hand varying Newtonian space of the combination, and we therefore have, throughout all variations of such space $$F'P' = D'A' = Z'V' \quad \text{......} \quad (13)$$

The co-varying mechanical space elements VZ, Z'V' therefore constitute a second set of mechanical Newtonian spaces, which may be identified as the Z Z' set, and which introduces a new set of linear dimensions, to wit: DZ, D'Z', $m''$, $x''$, $m'''$, $x'''$; also a new set of angular dimensions, to wit: epsilon ($\epsilon$), the old delta ($\Delta$) and epsilon prime ($\epsilon'$). These new dimensions are evidently connected in the same way as the corresponding dimensions of the A A' set, all as noted in the paired equations collected in the table annexed to and forming part of Fig. 8.

From disclosures made in Figs. 12 to 15 of my said Case T, page 3, line 129, down to page 4, line 90, the accuracy of the relations noted requires no additional proof.

By direct inspection in present Fig. 8, it is furthermore seen that the two distances $m$ and $m''$ at the left are connected by the equation $$m'' = m + AV \cdot \cos \alpha \quad \text{......} \quad (14)$$

where the product AV. cos $\alpha$ is a constant to be subtracted from $m$, although the plus sign must be used in the equation because the cosine of alpha ($\alpha$), in the case illustrated, is negative.

It is similarly evident that the distances $m'''$ and $m'$ at the right are connected by the equation $$m''' = m' + A'V' \cdot \cos \alpha' \quad \text{......} \quad (15)$$

Now in order that the linear dimensions shall all be whole numbers, easily verifiable by scale and by computation, the basic angle alpha ($\alpha$) used in Fig. 8 was selected so that its cosine shall be exactly equal to minus one-third; and with an eight place table, this is found to be 109° 28' 16.4'', or more simply in quadrants 1.2163 Q which is approximately 1.2 or 6/5 of a right angle.

Abnormal type, Fig. 9.

If the clamp screw 535, in the normal combination Fig. 8, be loosened, and the radial cam 516 with the four terminals D, A, V, Z, all in their present relation, be rotated clockwise through an angle theta ($\theta$) we obtain the abnormal combination of Fig. 9, where the paths VZ, Z'V' produced meet in X, at the same angle theta ($\theta$); and if now screw 535 be again tightened, the two radial cams 516, 516' will operate as before to determine the same co-varying constant product space elements VZ, Z'V'.

The new sector angle VDB, in Fig. 9, is really made up of two angles, to wit: the basic angle delta ($\Delta$) of the "normal type," Fig. 8, plus the mutual inclination theta ($\theta$) at X, Fig. 9, of the paths VZ, Z'V' respectively described by the two pintles V and V'.

As a matter of fact the sector angle VDB can in all cases, that is, in the "normal type," Fig. 8 as well as in the "abnormal type," Fig. 9, be represented by the general equation $$VDB = (\Delta + \theta) \quad \text{.........} \quad (16)$$

for, in the "normal type" Fig. 8, the paths VZ and Z'V' are parallel, and their mutual inclination theta ($\theta$) is nil, so that we then have, in Fig. 8, VDB equal to delta plus zero, or simply equal to delta ($\Delta$) as before stated.

Straight lever type, Fig. 10.

In Fig. 9, make the angle theta ($\theta$) exactly equal to the supplement of the basic angle delta ($\Delta$) or epsilon prime ($\epsilon'$) and we obtain the "straight lever" type seen in Fig. 10. This is the mechanical radial cam focuser that corresponds directly to the optical radial cam focuser first disclosed in Fig. 1 of my said Case A, as indicated in the present Fig. 10, by adding an eye and a line of sight that passes longitudinally along the middle line of the lever.

Right-angle gear, Fig. 11.

Making the basic angle delta ($\Delta$) in Fig. 8 equal to the quadrant, or one right-angle, we obtain the complete diagram Fig. 11 of radial cam focusing gear having a basic angle equal to one right angle.

This Fig. 11, therefore, corresponds to Fig. 15 of my said British patent, over which it has the advantage of clearly showing the exact relation that exists between the rectangular focuser of my present Fig. 1 to the rectangular focusers shown most clearly in Figs. 12 to 20 of my said Case U, where the co-variable similar triangles DAC and D'C'A' correspond respectively to the present co-variable similar triangles ZVD and Z'V'D'.

Fig. 12 type with sector angle VDB=180°.

In Fig. 11 rotate the left combination VD clockwise, about D, through one right angle, and we produce the form shown in Fig. 12, where the pintle V describes a path that is perpendicular to the path of pintle V'. Reduce DD' and BB' of Fig. 12 to zero value, and the two radial cams will form a straight lever of the first order, as in Marks, British Patent 13,934 of 1909, which is therefore seen to be radial cam gear of the rectangular type.

*Fig. 13 type with sector angle VBD=0°.*

In Fig. 11 rotate the left combination VD, counter-clockwise about D, through one right angle, instead of clockwise, and we produce the form shown in Fig. 13, where pintle V, as in Fig. 12, describes a path that is also perpendicular to the path of the pintle V', but the direction of the path is reversed. Now make DD' and its equal BB' both equal to zero in Fig. 13, and the two radial cams form a plain lever of the second or third order, as in Fig. 3 of Cook, British Patent 12738 of 1904, which is therefore also seen to be radial cam gear of the rectangular type.

*General remarks.*

NOTE 1.—In the simplest form, Fig. 6, the number of independent adjustments is 3, to wit: one (A'V', Fig. 3) in the gear proper to satisfy equation 4, and two ($m$ and $m'$) in the frame connections to satisfy equations 2 and 3.

NOTE 2.—As already explained in my said Case K (Notes 1 to 3 on pages 7 and 8) any copying or enlarging camera, with automatic focusing gear of any type whatever, requires the equivalent of these three independent adjustments, to wit: one in the "varying velocity ratio gear," or focusing mechanism proper, to permit of making due allowance for all accidental and contemplated variations in the focal length FN of the lens to be used; and two independent longitudinal adjustments in the frame connections to permit of making due allowance for all accidental and all contemplated variations in the extent, sign or location of the internodal space NN' of such lens.

NOTE 3.—Even when the camera is specially constructed for use with a lens of known make, standard type and size, some equivalent of these three independent adjustments is absolutely necessary, as fully explained in lines 41 to 85, page 9 of my said Case O, to permit of surely securing in all cases the highest available efficiency of the particular lens to be used. In current practice all lenses are different lenses; moreover, the use of the adjustments is so convenient and easy, that it will generally be resorted to as a time saver, even where all dimensions involved are exactly known beforehand.

NOTE 4.—The four axial points $a, d, d', a'$ are easily found in every simple form and in every complete form of focusing gear illustrated in my prior cases K, O, T, U and X; and, therefore, the above equations 2, 3, 5, 6, 7 and 8 apply generally and in every instance without exception or qualification.

NOTE 5.—The co-varying mechanical space elements of any conceivable form of focusing mechanism necessarily correspond in whole or in part to the mechanical Newtonian space elements $ad$, $d'a'$ of equation 6; and, therefore, equations 2, 3, 5, 6, 7 and 8 may be applied to all possible forms of automatic focusing cameras, even to such as shown in U. S. patent to Stender, No. 730,583, where the end frame pintles $p'$, $p$ project onto the lens axis at $a$ and $a'$, and where the spiral cam grooves, by whatever correct rule they may have been plotted, must if sufficiently extended toward the lens, necessarily contain zero points that project onto the lens axis as $d$ and $d'$.

NOTE 6.—The presence of a constant velocity ratio mechanism to change the varying velocity ratio displacements of the focusing gear proper (either in direction as in Marks, British Patent 13934 of 1909; or, in both direction and magnitude, as in Fig. 3 and lines 20 to 24, page 8 of Cook, British Patent 12734 of 1904) does not alter the fundamental principles involved.

NOTE 6a.—How a constant velocity ratio transmission, with suitable adjustments, may be utilized in combination with any conceivable type of otherwise non-adjustable but theoretically accurate focusing mechanism, to permit of using such mechanism with any one of different lenses, is set forth in my said Case Ab.

NOTE 7.—The lens frame has invariably been shown as the fixed frame, not because this is the preferred construction, but simply because it is the clearest; in this connection see Note 1 on page 4 of my said Case T.

NOTE 8.—Any one of the four terminals A, D, D', A', of the two Newtonian space elements $ad$, $d'a'$ of the mechanism may be totally absent or purely imaginary, as, for instance point A in Fig. 6. Four such 3-terminal conbinations are possible, to wit:

```
Case 1,  —  D   D'  A'
Case 2,  A   —  D'  A'
Case 3,  A   D   —  A'
Case 4,  A   D   D'  —
```

NOTE 9.—Any two of the four terminals A, D, D', A' may be absent or purely imaginary if they do not belong to the same Newtonian space elements $ad$ or $d'a'$. Four such 2-terminal combinations are possible, to wit:

```
Case 5,  —  D   —  A'
Case 6,  —  D   D'  —
Case 7,  A   —  —  A'
Case 8,  A   —  D'  —
```

NOTE 10.—When D and D' are merged in one point D, as in Fig. 6, for instance, the two terminals D and D' must be present together (Cases 1, 4 and 6 above) or they must both be absent (Case 7). So that we then have four different possible combinations, to wit:

Case 1',  —  D  A'
Case 4',  A  D  —
Case 6',  —  D  —
Case 7',  A  —  A'

NOTE 11.—Case 7 is a very common one. It presents itself, for instance, in Fig. 1, of Thompson British Patent No. 5583 of 1903, corresponding to Fig. 1 of Stender, U. S. Patent No. 730,583.

NOTE 12.—Case 7 presents itself also in Fig. 10 of my said Case U by suppressing the short crossbar 101 used to structurally represent the terminals D and D'. When such bar 101 is absent, either carriage 100 or 100' may be slid up into its zero position, without removing its respective pintle A or A', by simply setting the radial cams of the other pintle in parallel relation, both pointing to infinity, exactly as they would be held by such other pintle, A' or A, carried to infinity.

NOTE 13.—Case 7' presents itself in Fig. 2 of my said Case U by suppressing the short cross-bar 14, so that the carriages 30, 30' may freely be moved up into zero position by the radial cam itself.

NOTE 14.—Any special provision to permit of conveniently reducing either of the Newtonian space elements $ad$, $d'a'$ of the mechanism to zero value will answer, although some structural representation of all four terminals A, D, D', A', as in Fig. 10 of my said Case U, is generally preferable.

NOTE 15.—In Fig. 8 of Thompson, British Patent No. 5583 of 1903, pin $p$ projects as A and pin $p'$ projects as D'; the lens frame terminal D and the image-frame terminal A' are imaginary, as in Case 8.

NOTE 16.—My said Case A already discloses, in Figs. 1 to 24 (and more particularly in Fig. 17) with text in lines 33 to 40 of page 9, (also in the two equations annexed to and forming part of Fig. 23) a number of different theoretically exact optical focusers which are of the radial cam type with a basic angle, $r$ at G and $r$ at H, Fig. 23, that may differ from a right angle by any desired amount, either in excess or in deficiency, and usually in excess; but for reasons given in lines 12 to 63, page 3 of said Case A, no claims whatever were made, in said Case A, to such focusers of the radial cam type, and this fact is more particularly noted in lines 54 to 57, page 3, of said Case A.

NOTE 17.—I am aware that the acute sector angle VDV' of my Fig. 3, in the special case where the pintles V and V' are set to move in the same horizontal plane, corresponds geometrically to the acute angle AUA' pivoted at U in Fig. 71 page 93, of Cremona, *Elements of Projective Geometry*, Oxford, 1885; copy at Library of Congress. This Cremona disclosure, however, is: first, purely geometrical; secondly, not sufficiently general, in such geometrical treatment, for present purposes; thirdly, so involved with other, and there more important considerations, that these completely obscure those properties of the combination which are now proved of value in optics, by my present Case Au.

NOTE 18.—After the device of Fig. 4 has been fully adjusted for a given lens, it is clear that it might be adjusted for a slightly different lens and one given position of the object frame, by simply varying the sector angle delta ($\Delta$) to shift the image frame as required. Such adjustment, however, would be "illegitimate" and would generally introduce error in all other positions of the end frame. A similar objection applies to the use of only two adjustments. Hence any change in the lens calls for a repetition of three independent focusing adjustments, even where any one or more of such three adjustments is found to be such as to require no alteration for the new lens, because the fact that no change is required, in any one of the adjustable but normally rigid dimensions, can only be ascertained by a focusing operation. A legitimate adjustment of the sector angle delta ($\Delta$) is described in my said Case At.

NOTE 19.—In the optical focuser of my said Case At (just referred to in Note 18 above) only two of the angular adjustments shown in my present Fig. 4 are used, to wit: the adjustment to vary the sector angle VDB or delta ($\Delta$), and the adjustment to vary the end frame angle DAV or alpha ($\alpha$); but these two are sufficient to permit of satisfying the present Equation 1.

NOTE 20.—Fig. 19 of my said Case A already shows a radial cam focuser whose basic angle, equal to GG'N', is non-rectangular and which has the sufficient number and kind of adjustments to permit of securing 3-and-all-point correspondence between the said focuser and any one of different lenses. Such adjustments, however, are not "independent", because they involve a tentative or trial setting, and I accordingly refrained from making, in said Case A, any claims whatever to a "radial cam focuser"; and such failure to claim is specifically noted in the printed specification of said Case A, page 3, lines 54 to 57, with reasons in support thereof in lines 12 to 63 of the same page.

NOTE 21.—My later Case Ae, filed in 1915 and my still later Case At filed in 1917 finally complete the proof which is now contained in my five Cases A, U, Y, Ae and At that the principles of construction and adjustment first disclosed in Fig. 4 of my said Case Y, are general and are directly applicable in designing radial cam focusers either optical or mechanical and either shown or only referred to in my said five Cases A, U, Y, Ae, and At.

NOTE 22.—I am aware that Professor Élie in the *Journal de Physique*, Paris, 1880, pages 162 to 164, diagrammatically proposes what must be a form of "non-rectangular" radial cam for directly connecting the two axial conjugate foci P and P' of a lens with its principal foci F and F', and with each other so as to determine the Newtonian spaces PF and F'P' of the lens directly; but the Élie disclosure is hardly more than a form of lens graphics, and is, moreover, of such nature as to exclude all the independently variable linear elements of my various equations, so that it would not permit of constructing any one of the practical radial cam focusers shown in my said Cases A, U, Y or present Au, and Case At.

NOTE 23.—A construction which must closely resemble what Professor Élie may have had in mind is derived from my Fig. 8, as follows: In Fig. 8 make the four bracket elements AV, A'V', DZ and D'Z' each equal to $f$; make the two equal distances PV and FZ each equal to zero; finally make the two equal distances P'V' and F'Z' each equal to zero; and observe: first, that every restriction here made adds to the impracticability of the device as a focuser; secondly, that my Fig. 8, which is itself hardly more than a diagram, never could be derived from the Élie sketch, although it does comprise, as just seen, all that may be implied in the said Élie project.

NOTE 24.—My said Case A, page 20, Note 2, says that "The specific invention involved in the theoretically exact focusing devices of Figs. 1 to 24 is completed and, therefore, claimed in my said Case Ae." The said Case Ae, however, still lacks completeness, as a general case, in that it does not contain adjustments for changing the value of the basic angle delta ($\Delta$). Such angular adjustments are however disclosed by me, first, in Fig. 4 of my said earlier Case Y; secondly, in Fig. 5 in my said later Case At; and thirdly, in Figs. 4 and 8 to 13 of my present Case Au continuing Y. Moreover, as the present Case Au is the first to go to issue with a reasonably complete disclosure of all possible variations that may be made in the normally rigid structural dimensions of a radial cam focuser, I am making my broadest possible claim for an oblique angle radial cam focuser in the present Case Au, instead of making it in the said Case Ae, as contemplated in 1916 before the present application Case Au had been filed.

NOTE 25.—From disclosures made (1) in my said Case Ae; (2) in the present Case Au; (3) and especially, in my said later Case Bc, it is plain that any type of radial cam optical focuser seen in Figs. 1 to 24 of my said Case A may be derived from my present Fig. 8 without making any change in the co-varying triangles ZVD and Z'D'V' by simply designing Fig. 8 so as to make the dimension $m'''$ equal to zero; for, this places the terminal V' in the right hand conjugate plane P' considered as external object plane to be photographed.

NOTE 26.—My said case At is the first to disclose the use of adjustments in the basic angle as a direct means of regulation for, use with any one of different lenses.

What I claim as new and desire to secure by Letters Patent, is:—

1. The combination comprising a photographic camera and a focuser of the radial cam type, said focuser having a basic angle, herein designated by delta ($\Delta$), which differs from a right angle.

2. The combination comprising a photographic camera and a focuser of the radial cam type, said focuser having a basic angle, herein designated by delta ($\Delta$), which is smaller than a right angle.

3. The combination comprising a copying or enlarging camera having a wholly mechanical focuser of the radial cam type, said focuser having a basic angle herein designated by delta ($\Delta$) which differs from a right angle.

4. The combination comprising a photographic camera having a wholly mechanical focuser of the radial cam type, said focuser having a basic angle, herein designated by delta ($\Delta$), which is smaller than a right angle.

5. The combination with a photographic camera comprising an object support, a lens support and an image support, and means for guiding two of these three supports with relation to the third so that the relative positions of the said three supports may be changed as required to permit of securing the sharpest image of any desired size; said three supports being connected by a mechanical focuser of the radial cam type, whose basic angle, herein designated by delta ($\Delta$), is non-rectangular or oblique.

6. The combination with a photographic camera having a focuser of the radial cam type comprising: first, a radial arm adapted to connect the lens frame of the camera with its plate or film-holding frame; secondly, a second radial element mounted on the same said lens frame of the camera and adapted to register with a specific point that is connected with the material conjugate focal plane; thirdly means connecting said first two radial elements so they shall rotate in constant angular relation, such connecting means comprising a normally rigid unit composed of parts whose relative position can be varied to permit of setting the said constant angular relation or basic angle of the focuser at any desired value.

7. The combination with a copying or enlarging camera comprising a lens frame and two end frames, also guides to permit of changing the relative positions of said three frames as required to secure a sharply focused image at any desired scale of reproduction; of mechanism connecting said three frames to cause two of them to move with relation to the third so as to keep the said two end frames in focus on each other; said mechanism comprising two radial cams mechanically connected to turn simultaneously through equal angles; said radial cams being pivoted on the said lens frame and having combined pivotal and sliding engagement with the said end frames respectively; a pivot terminal on each of said end frames adapted to establish the said combined pivotal and sliding engagement, said pivot terminal being adjustable on its respective end frame in a direction that corresponds to the zero position of its respective radial cam.

8. A copying or enlarging camera with automatic focusing gear of the radial cam type, such gear comprising two radial cam elements arranged at an angle differing from a right angle, and connections to cause the said two radial cam elements to turn simultaneously through equal and similarly directed angles.

9. A copying or enlarging camera with automatic focusing gear of the radial cam type, such gear comprising two radial cam elements arranged at an acute angle, and connections to cause the said two radial cam elements to turn simultaneously through equal angles.

In testimony whereof, I have signed my name to this specification.

JOSEPH BECKER.

---

It is hereby certified that in Letters Patent No. 1,280,638, granted October 8, 1918, upon the application of Joseph Becker, of Washington, District of Columbia, for an improvement in "Copying and Enlarging Cameras," errors appear requiring correction as follows: In the drawings, Sheet 2, Fig. 4, under the reference-numeral "230'" for the reference-letter "B" read $B'$; in the printed specification, page 6, lines 89–90, strike out the phrase "respectively equal to AD and D' A'"; and that the said Letters Patent should be read with these corrections therein that the same may conform to the record of the case in the Patent Office.

Signed and sealed this 19th day of November, A. D., 1918.

[SEAL.]

R. F. WHITEHEAD,
*Acting Commissioner of Patents.*

Cl. 88—24.